US012187039B2

(12) United States Patent
Suda

(10) Patent No.: US 12,187,039 B2
(45) Date of Patent: Jan. 7, 2025

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Koji Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/154,186

(22) Filed: Jan. 13, 2023

(65) Prior Publication Data

US 2023/0241896 A1 Aug. 3, 2023

(30) Foreign Application Priority Data

Feb. 2, 2022 (JP) ................................. 2022-014889

(51) Int. Cl.
*B41J 2/175* (2006.01)

(52) U.S. Cl.
CPC ....... *B41J 2/17506* (2013.01); *B41J 2/17566* (2013.01); *B41J 2002/17569* (2013.01); *B41J 2002/17589* (2013.01)

(58) Field of Classification Search
CPC ................ B41J 2/17506; B41J 2/17566; B41J 2002/17569
See application file for complete search history.

(56) References Cited

U.S. PATENT DOCUMENTS

2013/0127937 A1* 5/2013 Masunaga ............ B41J 2/17566 347/6
2018/0281395 A1* 10/2018 Horade ................ B41J 2/17523

FOREIGN PATENT DOCUMENTS

JP 2019-059200 A 4/2019

* cited by examiner

*Primary Examiner* — Julian D Huffman
(74) *Attorney, Agent, or Firm* — Venable LLP

(57) ABSTRACT

A printing apparatus that includes: a first obtaining unit that obtains a usage amount of an expendable from a time point of detection of a situation where a remaining amount of the expendable in an expendable replenishment container is lower than a predetermined value; a second obtaining unit that obtains a remaining amount in a tank; a first determination unit that determines a state of the remaining amount of the expendable by comparing the usage amount obtained by the first obtaining unit and the remaining amount in the tank obtained by the second obtaining unit with thresholds set respectively for the usage amount and the remaining amount; and a detection unit that detects the situation where the remaining amount of the expendable is lower than the predetermined value, in a case where the state determined by the first determination unit is a remaining amount low state.

19 Claims, 12 Drawing Sheets

PRINTING APPARATUS, CONTROL METHOD OF PRINTING APPARATUS, AND STORAGE MEDIUM

BACKGROUND

Field

The present disclosure relates to a technique of managing a remaining amount of an expendable.

Description of the Related Art

In recent years, printers that include liquid tanks into which inks of liquid bottles can be injected have appeared. Japanese Patent Laid-Open No. 2019-59200 (hereinafter, referred to as Literature 1) proposes a method in which paired electrodes are arranged in an ink bottle and an ink remaining amount in the ink bottle is detected by using a resistance value between the paired electrodes.

SUMMARY

There is a demand for a technique of preferably detecting the remaining amount of the ink without using a special mechanism like that in Literature 1.

A printing apparatus according to an aspect of the present disclosure is a printing apparatus that includes a tank configured to store an expendable injected from an expendable replenishment container and that prints an image by ejecting the expendable from the tank, the printing apparatus including: a first obtaining unit that obtains a usage amount of the expendable from a time point of detection of a situation where a remaining amount of the expendable in the expendable replenishment container is lower than a predetermined value; a second obtaining unit that obtains a remaining amount in the tank; a first determination unit that determines a state of the remaining amount of the expendable in the expendable replenishment container by comparing the usage amount obtained by the first obtaining unit and the remaining amount in the tank obtained by the second obtaining unit with thresholds set respectively for the usage amount and the remaining amount; and a detection unit that detects the situation where the remaining amount of the expendable in the expendable replenishment container is lower than the predetermined value, in a case where the state determined by the first determination unit is a remaining amount low state.

Further features of the present invention will become apparent from the following description of exemplary embodiments with reference to the attached drawings.

DESCRIPTION OF THE EMBODIMENTS

A preferable embodiment of the present disclosure is described below in detail with reference to the attached drawings. Note that the following embodiment does not limit the present disclosure according the scope of claims, and not all of combinations of features described in the present embodiment are necessarily essential for the means of solving the present disclosure. Moreover, an expendable is described as ink in the following embodiment.

Embodiment 1

Figure 1:
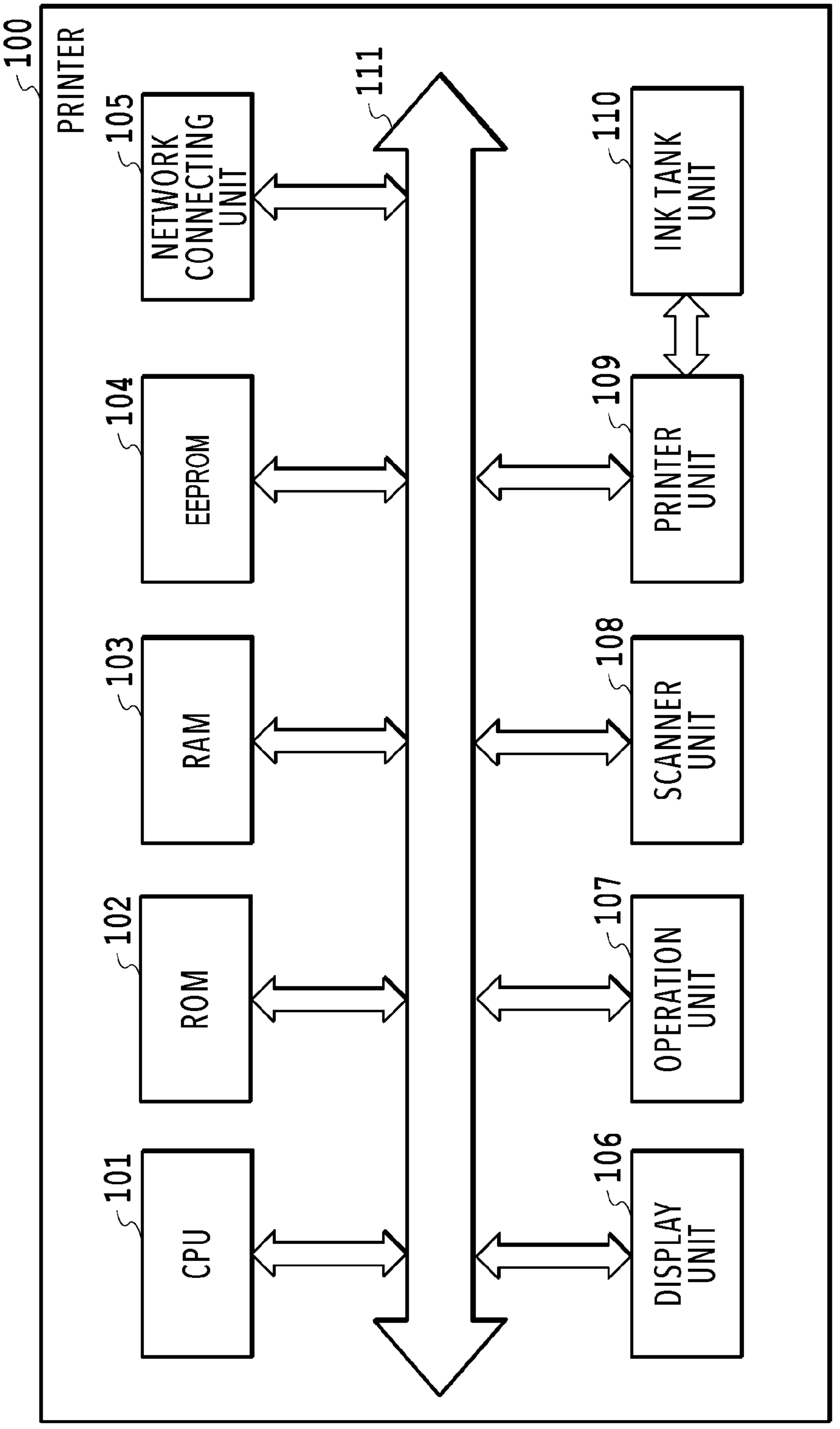
FIG. 1 is a block diagram illustrating a hardware configuration of a printer.
Figure 2:
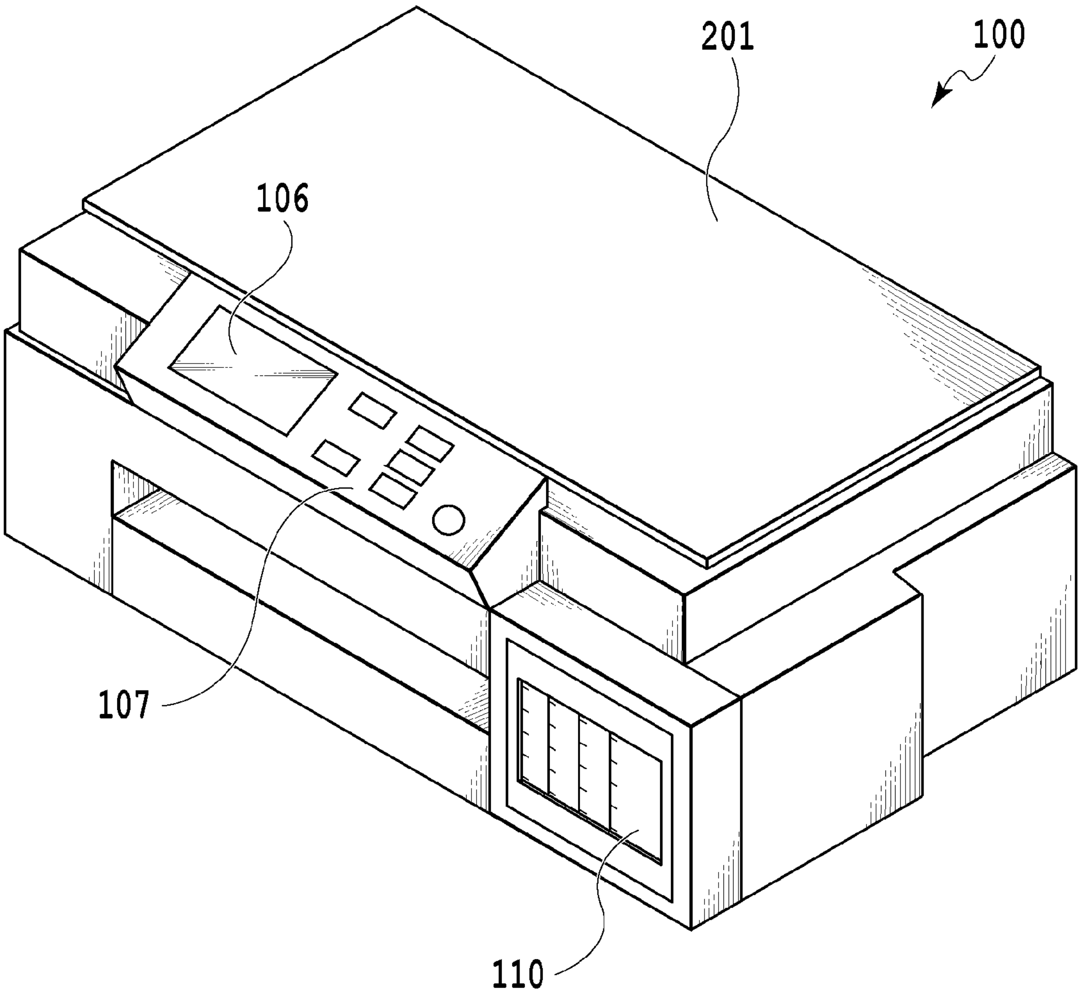
FIG. 2 is a schematic view of the printer.

FIG. 1 is a block diagram illustrating an example of a hardware configuration of a printer 100. FIG. 2 is a schematic view illustrating an example of the printer 100.

The printer 100 includes a CPU 101, a ROM 102, a RAM 103, and an EEPROM 104. The printer 100 also includes a network connecting unit 105, a display unit 106, an operation unit 107, a scanner unit 108, and a printer unit 109.

Figure 7:
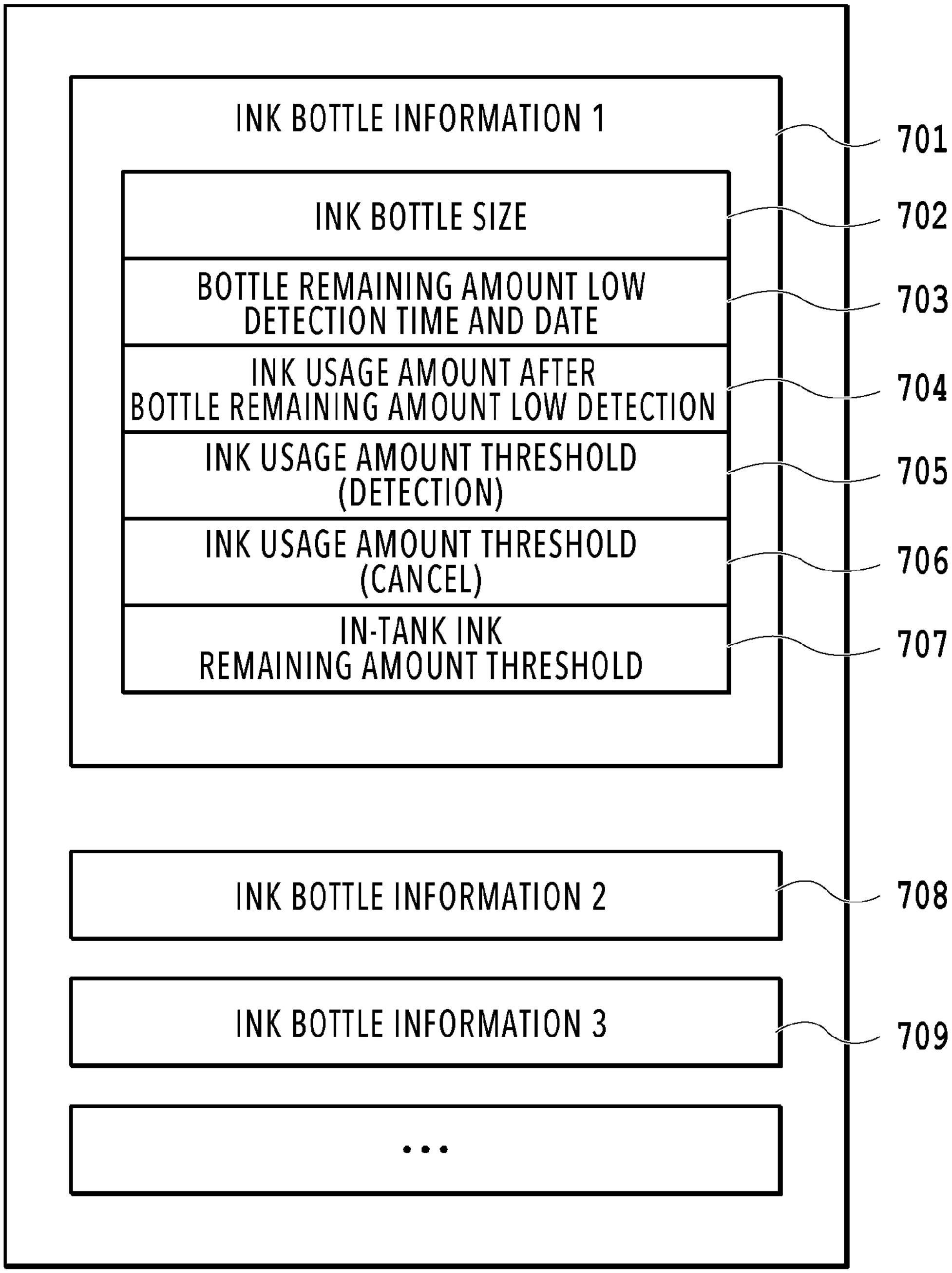
FIG. 7 is a diagram illustrating ink bottle information in a non-volatile memory in the printer.

The CPU 101 is a central processing unit for controlling various units in the printer 100. Various program codes are stored in the ROM 102. Image data and the like are temporarily stored and buffering is performed in the RAM 103 in execution of various services. Non-volatile information is stored in the EEPROM 104. The non-volatile information is shipping destination information of the printer 100, setting of a language to be displayed on the display unit 106, and the like. In the present embodiment, ink bottle information illustrated in FIG. 7 is particularly stored. Details are described later by using FIG. 7.

The network connecting unit 105 is connected to an external apparatus via USB or a network. Specifically, the network connecting unit 105 is connected to USB or a network to perform communication with an external apparatus. Image data and the like received by the network connecting unit 105 are also stored in the RAM 103.

The display unit 106 is formed of, for example, a liquid crystal display or the like, and can display characters, figures, indicators, and the like. The display unit 106 is not limited to a liquid crystal display, and may be formed by using an LED or other displays. Information displayed by the display unit 106 includes, for example, setting information for the printer 100, information on an ink housed in each of ink tanks, and the like. Moreover, the information on the ink includes, for example, information on a remaining amount of the ink housed in the ink tank, ink injecting instruction information, and the like. Note that the CPU 101 controls display contents of the display unit 106. The operation unit 107 is a switch, a hard key, or the like on which the user performs various input operations. Alternatively, a form in which the display unit 106 serves a function of the operation unit for performing the input operations as in a touch panel may be employed.

The scanner unit 108 implements a scanning function in the printer 100. The printer unit 109 implements a printing function. The inks are stored in ink tank unit 110. The ink tank unit 110 includes ink injection ports 302, and the inks can be injected into the ink tank unit 110 from ink bottles 303. The ink bottles are also referred to as expendable replenishment containers. The printer unit 109 includes an inkjet head, and the inks are supplied from the ink tank unit 110 to the inkjet head via tubes. Moreover, the printer unit 109 prints an image on a print medium such as a print sheet or the like by an inkjet method, based on image data received from the outside, image data read from the scanner unit 108, or the like. Moreover, the printer unit 109 manages the ink information of the ink tanks including the ink remaining amount information or sheet information including information on the number of stacked sheets. The scanner unit 108 optically scans an original set on an original plate 201 to convert the original to electronic data, further converts the electronic data to image data of a specified file format, and sends the image data to the external apparatus via the network or stores the image data in a storage area of an HDD or the like. A copy function is implemented as follows. The image data generated by scanning the original placed on the original plate 201 with the scanner unit 108 is transferred to the printer unit 109, and the printer unit 109 prints an image on the print medium based on the transferred image data.

The aforementioned units are connected to one another by a bus 111 and can exchange data with one another. Note that, although the printer 100 that is a multifunction peripheral is described as an example of an ink ejection apparatus, the ink ejection apparatus to which the present embodiment can be applied is not limited to a printer. A copying machine, a facsimile, or the like may be used as the ink ejection apparatus, or a printer that has no scanning function may be used.

FIG. 2 is a diagram schematically explaining the printer 100 described in FIG. 1. The printer 100 with a box-shape case includes the display unit 106, the operation unit 107, the ink tank unit 110, and the original plate 201.

Figure 3A:
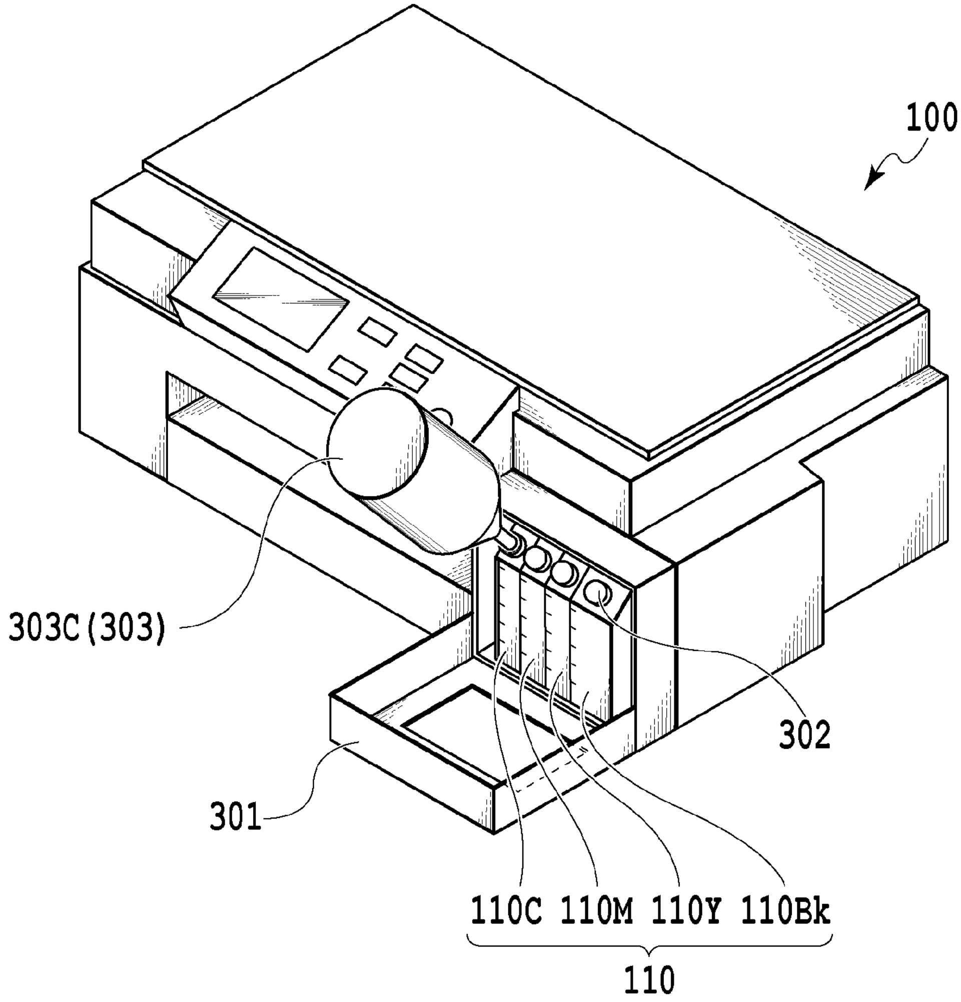
FIGS. 3A and 3B are schematic views illustrating a method of injecting ink into the printer.
Figure 3B:
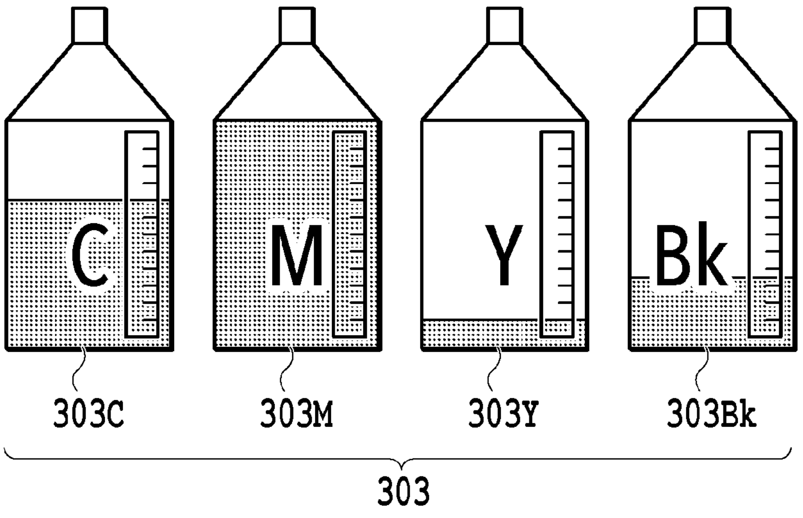

FIGS. 3A and 3B are schematic views illustrating a method of injecting one of the inks in the printer 100. Opening an ink tank cover 301 of the printer 100 allows access to the ink tank unit 110. After the ink tank cover 301 is opened, a cap provided at the ink injection port 302 is opened, and the ink is supplied from the ink bottle 303 to the ink tank unit 110.

In the present embodiment, the printer 100 forms a color printer that prints a color image on the print medium by ejecting multiple types of inks varying in color. Accordingly, the printer 100 is provided with four types of ink tanks for storing inks of four colors of yellow, cyan, magenta, and black. In the following description, alphabets are attached to indicate the four colors in a simplified manner such as C for cyan, M for magenta, Y for yellow, and Bk for black. Specifically, four types of ink tanks of an ink tank 110C, an ink tank 110M, an ink tank 110Y, and an ink tank 110Bk are housed in the ink tank unit 110 of FIG. 3A. Moreover, in the present embodiment, the ink bottles 303 refer to four types of ink bottles of an ink bottle 303C, an ink bottle 303M, an ink bottle 303Y, and an ink bottle 303Bk. The ink tanks in the present embodiment have substantially the same basic configuration. In the case where the ink tanks are to be collectively described in the following description, the ink tank unit is denoted by reference numeral 110. Moreover, in the case where the ink bottles are to be collectively described, the ink bottles are denoted by reference numeral 303.

Figure 4:
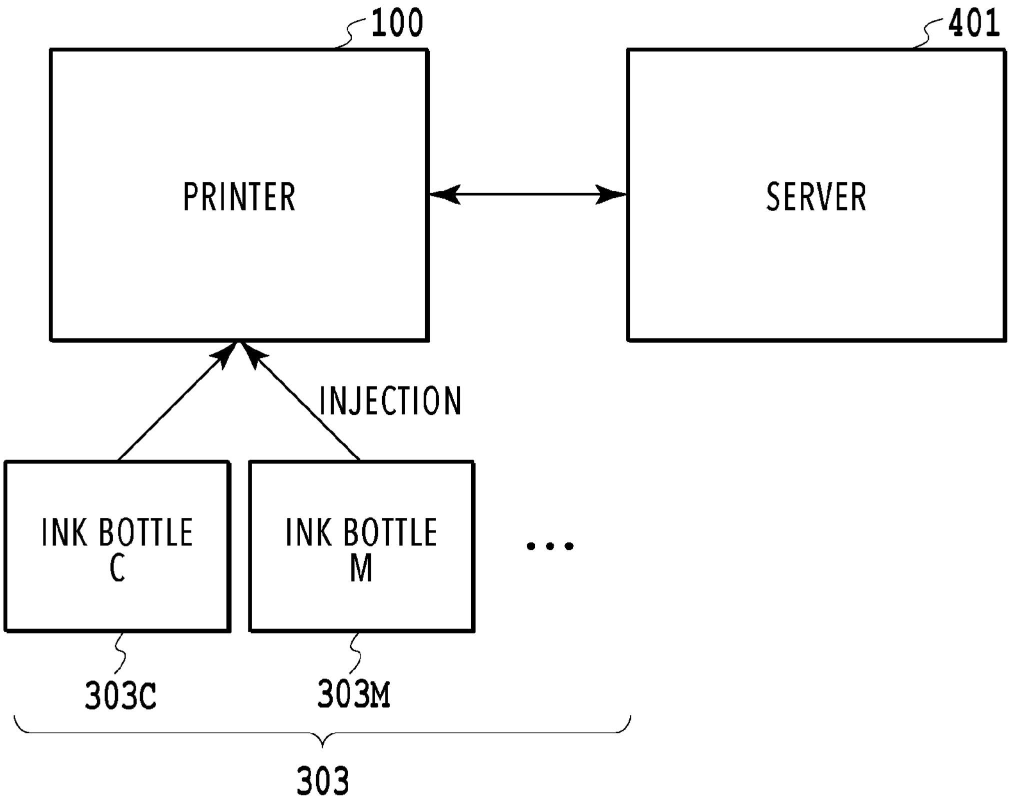
FIG. 4 is a diagram illustrating a configuration of an entire system.

FIG. 4 is a system diagram illustrating relationships of apparatuses involved in the present embodiment. As described in FIG. 3B, the printer 100 has such a mechanism that the inks are injected by using the ink bottles 303. Moreover, the ink injection ports 302 have different shapes depending on colors, and have such a mechanism that inks cannot be injected from ink bottles of different colors. For each ink, the printer 100 detects a situation where the ink remaining amount in the ink bottle 303 is low, based on an ink remaining amount in the ink tank unit 110 and an amount of the ink used in the printer 100. Information on the detected ink remaining amount low in the ink bottle is transmitted to a server 401 via transmitting means. There are various forms of transmitting means such as, for example, a wireless LAN, Bluetooth, a public Internet line, infrared communication, and wired USB. The server 401 provides a service such as delivery of the ink bottle 303 based on the information on the ink remaining amount low of the ink bottle 303 notified of by the printer 100.

Figure 5:
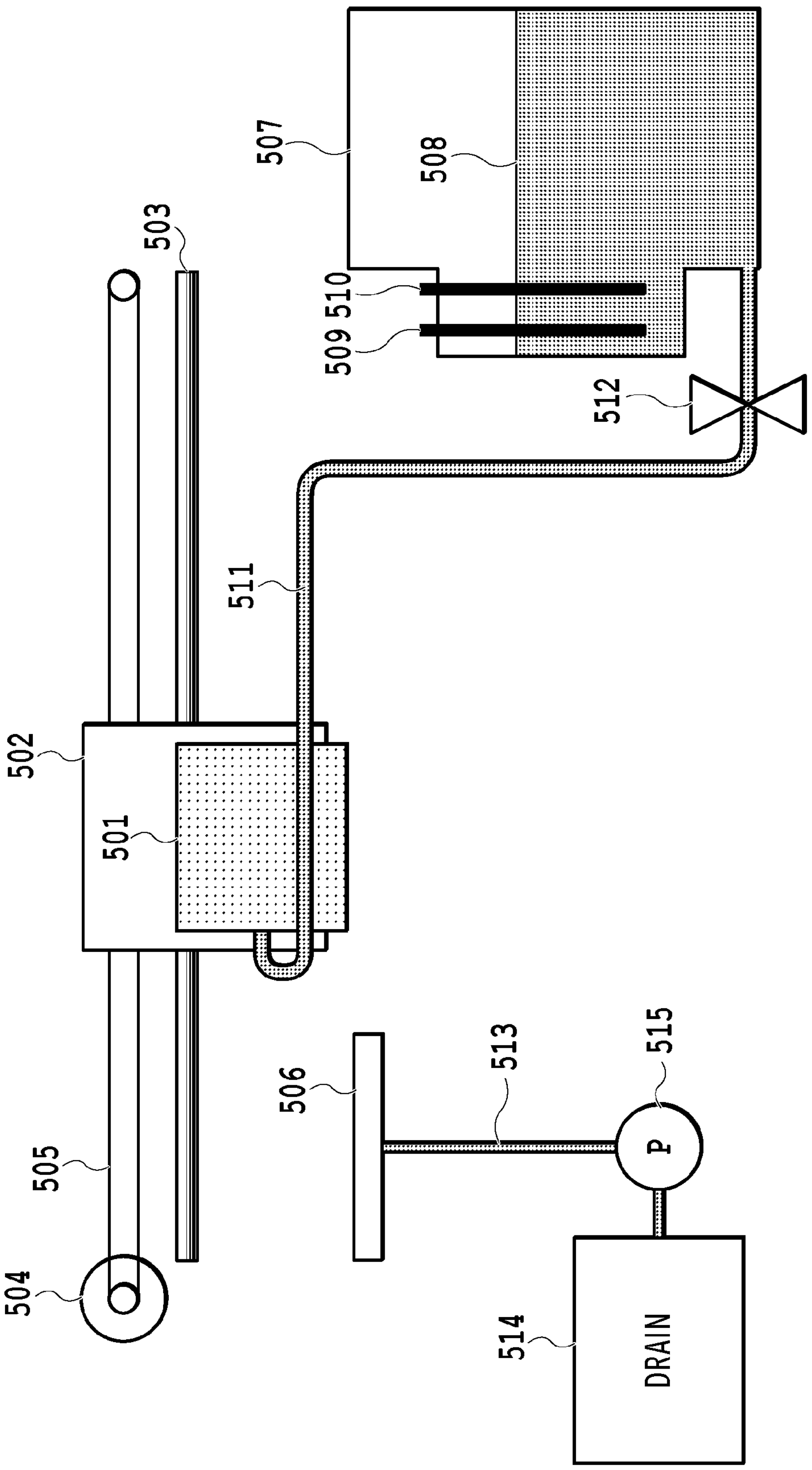
FIG. 5 is a schematic diagram illustrating a mechanism of ink supply in the printer.

FIG. 5 is a diagram illustrating a schematic configuration of a print head and an ink tank in the printer 100. In this section, a configuration in which the number of ink colors is one is described to facilitate understanding. However, the configuration is not limited to that for one color.

The printer 100 includes a print head 501, a carriage 502, a guide shaft 503, a carriage motor 504, a belt 505, a cap unit 506, and an ink tank 507. The printer 100 also includes a supply tube 511, a choke valve 512, a discharge tube 513, a waste ink absorber 514, and a suction pump 515.

The print head 501 is an inkjet print head. The carriage 502 drives the print head 501. The guide shaft 503 is a shaft for supporting the carriage 502. The carriage motor 504 is a motor that drives the carriage. Driving the carriage motor 504 rotates the belt 505, and the carriage 502 coupled to the belt 505 can move laterally from side to side. The cap unit 506 is brought into tight contact with an ejection surface of the print head 501 to prevent the ejection surface of the print head 501 from drying and avoid non-ejection. Moreover, the cap unit 506 also has a recovery function such as idle ejection or suction recovery for a nozzle row of the print head 501.

The ink tank 507 is one of the ink tanks of the ink colors included in the ink tank unit 110 of FIG. 3A. An ink 508 is stored in the ink tank 507. Moreover, paired electrodes 509 and 510 are provided inside the ink tank 507 in a state capable of coming into contact with the ink 508. The ink 508 passes through the supply tube 511 to be supplied to the print head 501, and is ejected. The electrodes 509 and 510 obtain voltage or the like that is a potential difference between a potential at time of voltage application to the electrodes and a potential at time of end of the application, and this electric information is compared with a threshold to determine presence or absence of the ink remaining amount in the ink tank 507.

The choke valve 512 is provided in the middle of the supply tube 511, and controls the inner pressure of the supply tube 511 in the suction recovery performed in the case where the ink 508 is supplied to the print head 501. This enables removal of unnecessary bubbles and foreign objects in the supply tube 511. The supply tube 511 is a tube for supplying the ink from the ink tank 507 to the print head 501. The discharge tube 513 is a tube for discharging the ink to the waste ink absorber 514.

The suction pump 515 can perform suction and discharge on the print head 501 and the supply tube 511 by bringing the ejection surface of the print head 501 into tight contact with the cap unit 506 and depressurizing the cap unit 506. Specifically, the suction pump 515 can supply the ink to the print head 501 and the supply tube 511. Moreover, the suction pump 515 can perform a suction recovery operation of discharging air bubbles in the print head 501 and the supply tube 511 together with the ink. The waste ink absorber 514 stores the ink sucked and discharged through the discharge tube 513.

Figure 6:
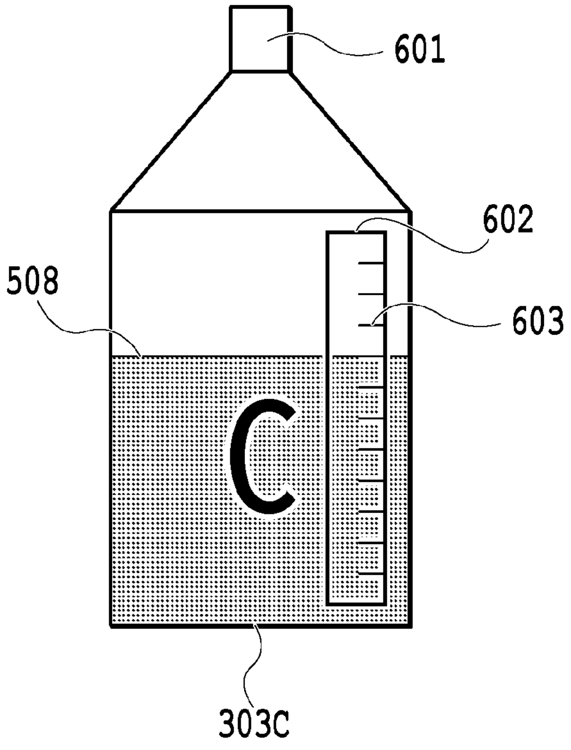
FIG. 6 is a schematic diagram illustrating an exterior of an ink bottle.

FIG. 6 is a diagram schematically illustrating the ink bottle 303. FIG. 6 illustrates the ink bottle 303C that is the ink bottle of the cyan ink as an example. The ink bottle 303C includes an extraction port 601, a small window 602, and a scale 603. The ink bottle 303C contains the ink 508, and the remaining amount of the ink 508 is a little over half the ink bottle 303C in the example of FIG. 6. In the case where a front end of the extraction port 601 is interlocked with the ink injection port 302, the injection of the ink starts. The shape of the extraction port 601 varies depending on the color to prevent injection of a wrong color. The shape of the extraction port 601 is changed not only for the inks of the respective colors but also for an ink whose tint changes in the case where the ink is mixed with another ink due to a difference in a composition of the ink to secure image quality. The small window 602 is provided to visually check the remaining amount of the ink. The small window 602 is made of a transparent member, and allows a user to grasp the remaining amount of the ink 508 by being used together with the scale 603. In the present embodiment, the entire ink bottle 303 is made of a material that does not completely transmit light to reduce optical changes in the ink, and has such a mechanism that the remaining amount is grasped through the small window 602. However, in the case where the ink is made of a material less likely to be optically changed, the entire bottle may be transparent.

FIG. 7 illustrates non-volatile information on the ink bottles 303 stored by the printer 100. The non-volatile information on the ink bottles 303 is stored in the EEPROM 104. The non-volatile information includes ink bottle information of each ink bottle. "Ink bottle information 1" 701 holds information relating to bottle remaining amount determination. Specifically, the "ink bottle information 1" 701 holds an ink bottle size 702, bottle remaining amount low detection time and date 703, an ink usage amount after bottle remaining amount low detection 704, an ink usage amount threshold (detection) 705, an ink usage amount threshold (cancel) 706, and an in-tank ink remaining amount threshold 707. Moreover, there is the ink bottle information for each ink bottle such as the "ink bottle information 1" 701, "ink bottle information 2" 708, "ink bottle information 3" 709, and so on. Each piece of ink bottle information holds the information relating to the bottle remaining amount determination.

The ink bottle size 702 holds information on the size of the used ink bottle 303. The bottle remaining amount low detection time and date 703 holds information on time and date at which the bottle remaining amount low is detected. A method of bottle remaining amount low detection determination is described later by using FIG. 9. The ink usage amount after bottle remaining amount low detection 704 holds an amount of the ink of the corresponding color used in the printer 100 from a point where the bottle remaining amount low is detected. The held ink amount holds, for example, a dot count value of the ink ejected from the print head 501. Moreover, an addition method of the ink usage amount is described later by using FIG. 11. The ink usage amount threshold (detection) 705 is a threshold of the ink usage amount used in the bottle remaining amount low detection determination. The ink usage amount threshold (cancel) 706 is a threshold of the ink usage amount used in bottle remaining amount low cancel determination. A method of the bottle remaining amount low cancel determination is described later by using FIG. 10. The in-tank ink remaining amount threshold 707 is a threshold of an ink remaining amount in the tank used in the bottle remaining amount low detection determination.

Figure 8:
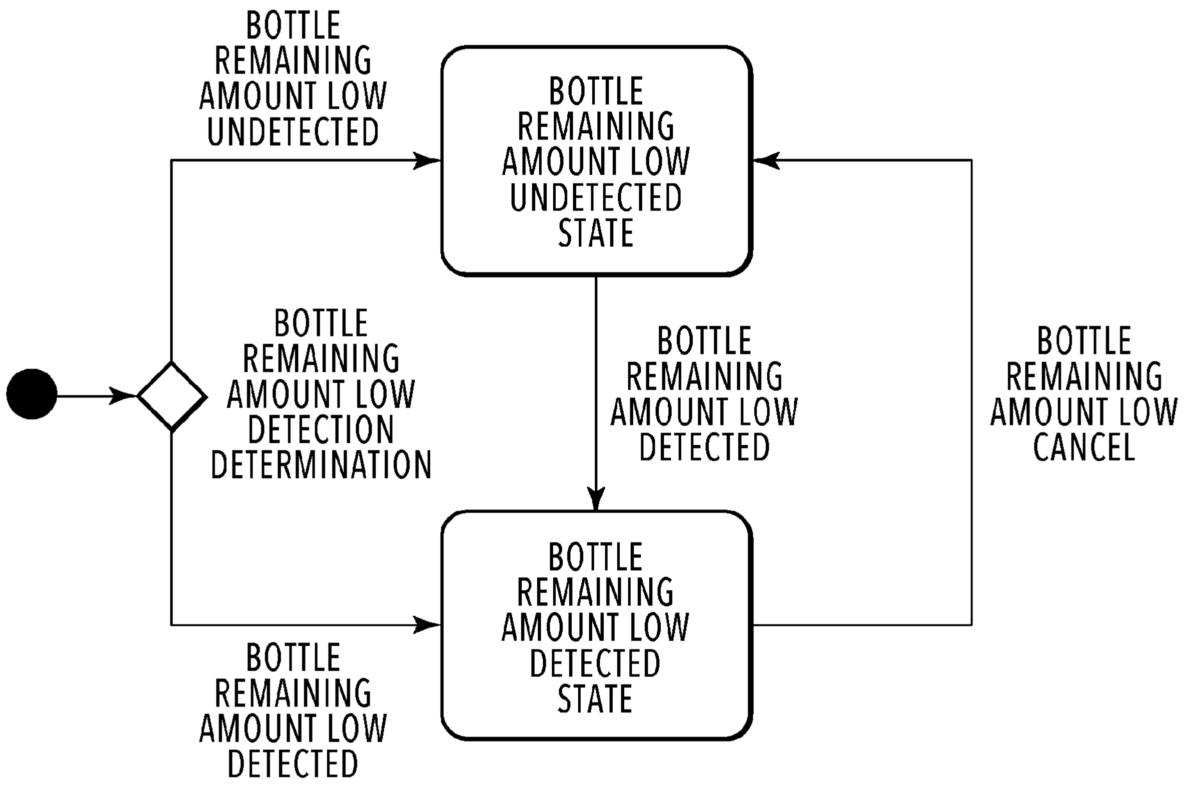
FIG. 8 is a state transition diagram of an ink bottle remaining amount state.

FIG. 8 illustrates a state transition diagram of a bottle remaining amount state of the ink bottle 303 managed in the printer 100. A black circle in FIG. 8 represents a state where the state of the bottle remaining amount is not determined just after printer activation. In this case, the state transitions to a rhombus-shaped portion in FIG. 8, and the bottle remaining amount low detection determination is performed. The state transitions to a "bottle remaining amount low detected state" or a "bottle remaining amount low undetected state" based on the determination. Then, determination depending on the "bottle remaining amount low detected state" or the "bottle remaining amount low undetected state" is performed, and the state transitions back and forth between the "bottle remaining amount low detected state" and the "bottle remaining amount low undetected state". The printer 100 transmits the bottle remaining amount state of each ink bottle in response to an inquiry from the server 401.

Figure 9:
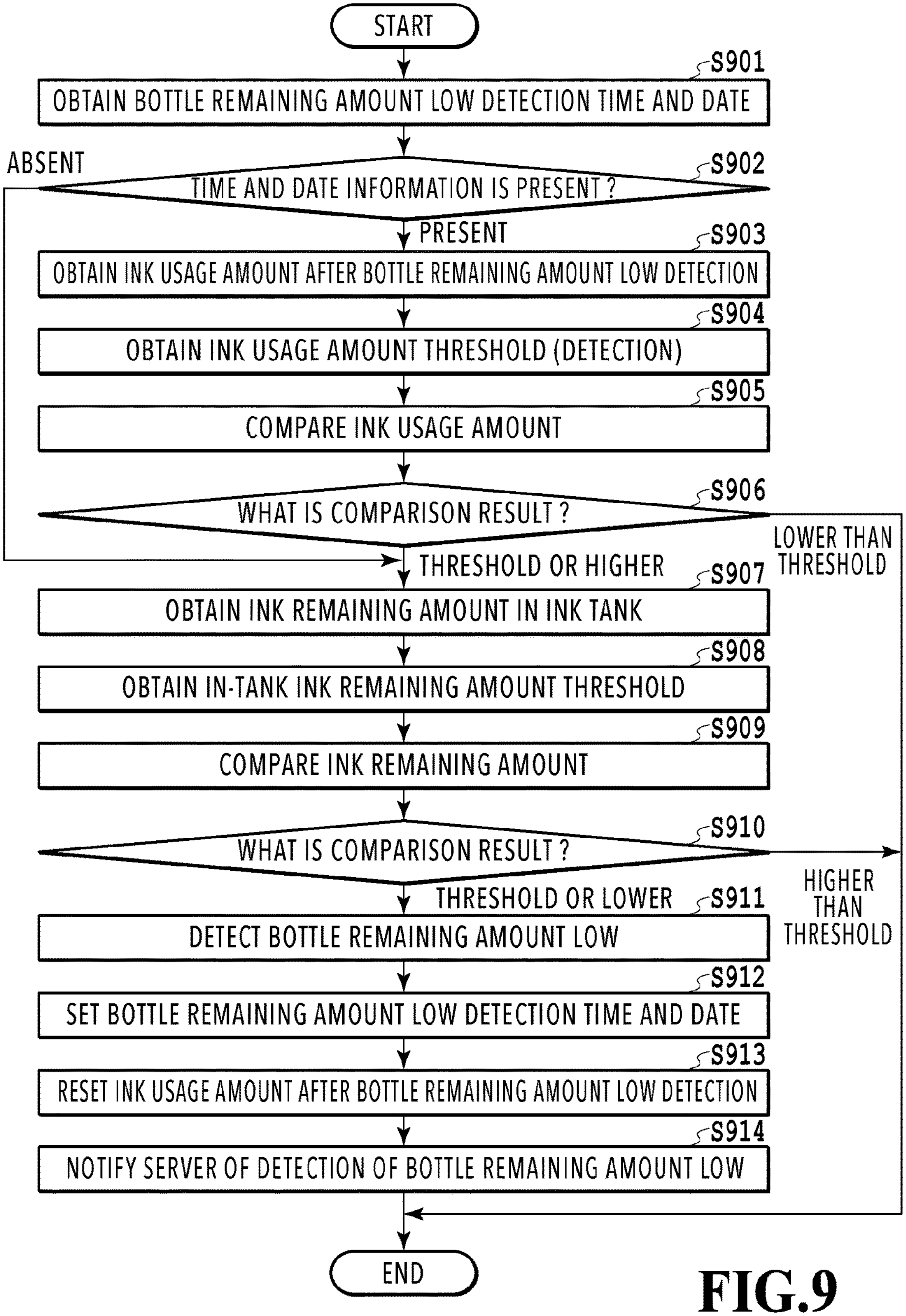
FIG. 9 is a flowchart of bottle remaining amount low detection determination.

FIG. 9 is a flowchart of the bottle remaining amount low detection determination performed in the printer 100. In order to detect a situation where the remaining amount of the ink bottle 303 is lower than a predetermined value, the remaining amount in the ink bottle needs to be estimated based on a measurement result of the amount of ink used in the printer 100. However, a measurement error occurs in the measurement of the amount of ink used in the printer 100. Accordingly, the ink remaining amount low is sometimes detected even though the ink is left in the ink bottle 303. Moreover, the printer 100 sometimes determines that the ink is left even though there is no ink in the ink bottle 303. In the present embodiment, description is given of a method of detecting the situation where the ink remaining amount in the ink bottle 303 is low, without provision of special mechanisms such as electrodes to the ink bottle 303.

For example, the CPU 101 illustrated in FIG. 1 reads out a program stored in the ROM 102 to the RAM 103 and executes the program to implement each of processes in FIG. 9. These processes are executed for each ink bottle, for example, at a timing at which the printer 100 is activated, a timing at which the printer 100 recovers from an energy-saving state, a timing at which the printer 100 establishes connection with the server 401, a timing at which the printer 100 uses the ink, and the like. Although each of the present processes normally needs to be performed as many times as the number of ink colors of the ink bottles 303, description is given in the present embodiment while focusing on one color to facilitate understanding. Symbol "S" in the description of each of processes below means step in the corresponding flowchart.

Moreover, the bottle remaining amount low detection determination process of FIG. 9 includes steps whose processing contents vary between a first-time execution and a second-time execution and beyond. One-time execution of the process is performing S901 to S914 in FIG. 9. The steps vary because the bottle remaining amount low detection time and date 703 and the ink usage amount after bottle remaining amount low detection 704 described in FIG. 7 are information saved and updated in the EEPROM 104 in the course of executing the present process, and are not saved in the EEPROM 104 in the process executed for the first time. Accordingly, for the steps whose processing contents vary between the first-time execution and the second-time execution and beyond, description is given for both of the process executed for the first time and the process executed for the second time and beyond as appropriate.

In the case where the bottle remaining amount low detection determination is started, in S901, the printer 100 obtains the bottle remaining amount low detection time and date 703 for the corresponding ink bottle, from the non-volatile information saved in the EEPROM 104.

In S902, the printer 100 determines whether the bottle remaining amount low detection time and date 703 is obtained from the EEPROM 104. The bottle remaining amount low detection time and date 703 is essentially information set in S912 to be described later. In the process executed for the first time, the bottle remaining amount low detection time and date 703 is not saved in the EEPROM 104, and thus cannot be obtained. In such a case, the printer 100 proceeds to S907. In the case where the present process is the process executed for the second time or beyond and the bottle remaining amount low detection time and date 703 is saved in the EEPROM 104, the printer 100 obtains the bottle remaining amount low detection time and date 703, and proceeds to S903. Specifically, processes of S903 to 906 are processes in the second-time execution and beyond.

In S903, the printer 100 obtains the ink usage amount after bottle remaining amount low detection 704 from the non-volatile information saved in the EEPROM 104. The ink usage amount after bottle remaining amount low detection 704 is information saved in the EEPROM 104 in the previous bottle remaining amount low detection determination process. After the obtaining of the ink usage amount after bottle remaining amount low detection 704, in S904, the printer 100 obtains the ink usage amount threshold (detection) 705 from the non-volatile information saved in the EEPROM 104.

In S905, the printer 100 compares the ink usage amount after bottle remaining amount low detection 704 with the ink usage amount threshold (detection) 705. In S906, the printer 100 performs branching of the process depending on a result of the comparison in S905. Specifically, in the case where the ink usage amount after bottle remaining amount low detection 704 is the ink usage amount threshold (detection) 705 or higher, it can be assumed that the remaining amount of the ink in the ink bottle 303 is low. Accordingly, the printer 100 proceeds to S907 and proceeds to a step of checking the ink remaining amount in the ink tank 507. Meanwhile, in the case where the ink usage amount after bottle remaining amount low detection 704 is lower than the ink usage amount threshold (detection) 705, it can be assumed that the ink remaining amount in the ink bottle 303 is plenty. Accordingly, the printer 100 determines that the bottle remaining amount low is not detected, and terminates the present process.

In S907, the printer 100 obtains the ink remaining amount in the ink tank 507. In S908, after the obtaining of the ink remaining amount in the ink tank 507, the printer 100 obtains the in-tank ink remaining amount threshold 707 from the non-volatile information saved in the EEPROM 104. In S909, the printer 100 compares the ink remaining amount in the ink tank 507 with the in-tank ink remaining amount threshold 707. In S910, the printer 100 performs branching of the process depending on a result of the comparison in S909. Specifically, in the case where the ink remaining amount in the ink tank 507 is the in-tank ink remaining amount threshold 707 or lower, the printer 100 proceeds to S911. Meanwhile, in the case where the ink remaining amount in the ink tank 507 is higher than the in-tank ink remaining amount threshold 707, the printer 100 determines that the bottle remaining amount low is not detected, and terminates the determination.

In S911, the printer 100 detects the bottle remaining amount low. Moreover, the state of the ink bottle remaining amount is set to "bottle remaining amount low detected state". In the case where the bottle remaining amount low is detected, in S912, the printer 100 updates the bottle remaining amount low detection time and date 703 in the non-volatile information saved in the EEPROM 104 to the current time and date. In S913, after the update of the bottle remaining amount low detection time and date 703, the printer 100 resets the ink usage amount after bottle remaining amount low detection 704 in the non-volatile information saved in the EEPROM 104. In S914, the printer 100 notifies the server 401 of the detection of the bottle remaining amount low. Then, the printer 100 terminates the present process.

As described above, executing the present flow allows the printer 100 to detect the ink remaining amount low of the ink bottle 303 and notify the server 401 of the ink remaining amount low without provision of a mechanism that measures the ink remaining amount in the ink bottle 303.

Figure 10:
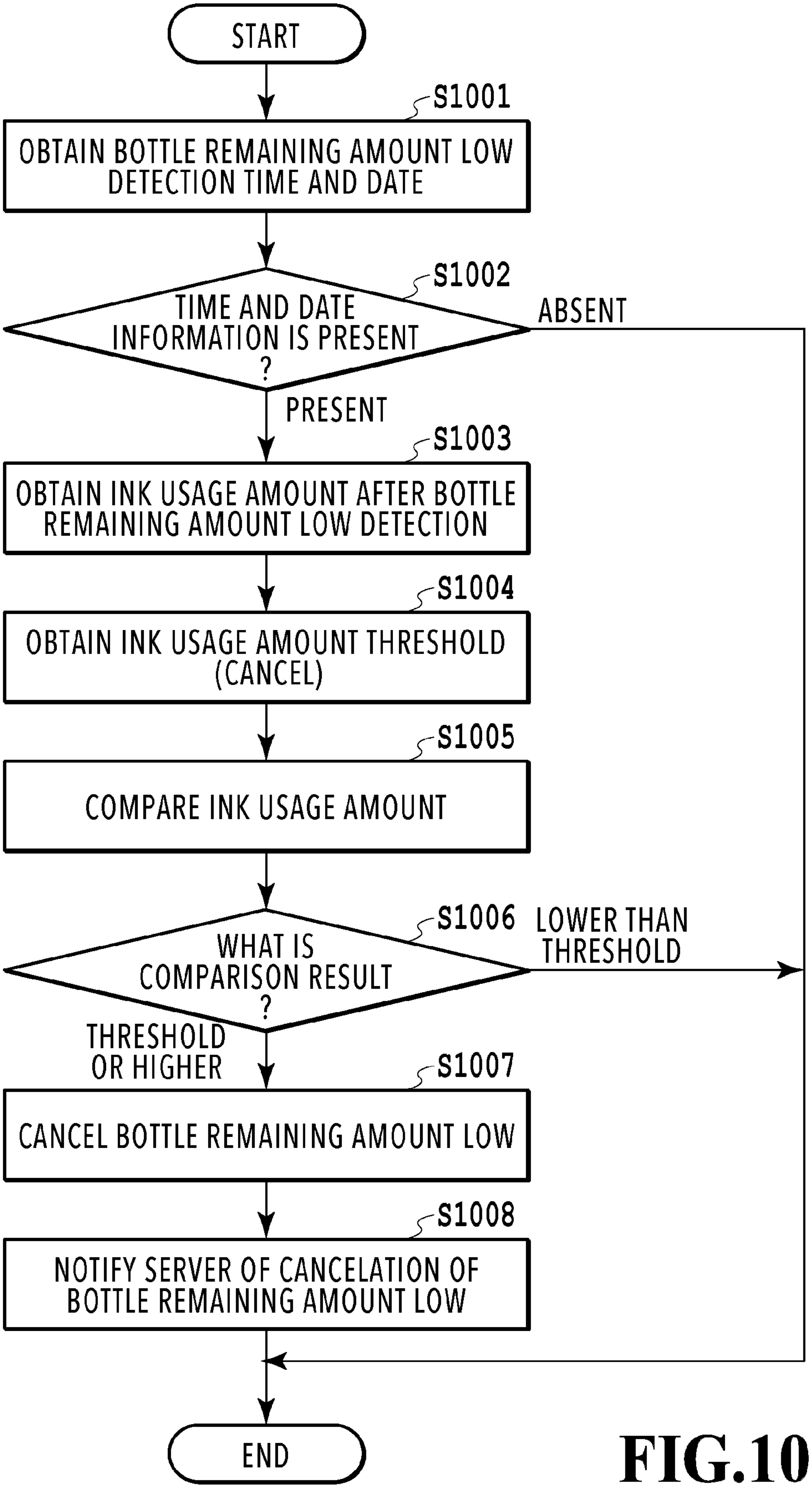
FIG. 10 is a flowchart of bottle remaining amount low cancel determination.

FIG. 10 is a flowchart of the bottle remaining amount low cancel determination executed in the printer 100 in the present embodiment. For example, the CPU 101 illustrated in FIG. 1 reads out a program stored in the ROM 102 to the RAM 103 and executes the program to implement the present process. Although the present process normally needs to be performed as many times as the number of ink colors of the ink bottles 303, description is given in the present embodiment while focusing on one color to facilitate understanding. The present process is executed, for example, at a timing where the ink is used in the printer 100. Moreover, the present process is a process performed in the "bottle remaining amount low detected state" as described in FIG. 8.

In the case where the bottle remaining amount low cancel determination is started, in S1001, the printer 100 obtains the bottle remaining amount low detection time and date 703 for the corresponding ink bottle, from the non-volatile information saved in the EEPROM 104. In S1002, the printer 100 determines whether the bottle remaining amount low detection time and date 703 is obtained from the EEPROM 104. In the case where the bottle remaining amount low detection time and date 703 is obtained, the printer 100 proceeds to S1003. In the case where the bottle remaining amount low detection time and date 703 is not obtained, the printer 100 terminates the present process.

In S1003, the printer 100 obtains the ink usage amount after bottle remaining amount low detection 704 from the non-volatile information saved in the EEPROM 104. Moreover, in S1004, the printer 100 obtains the ink usage amount threshold (cancel) 706 from the non-volatile information saved in the EEPROM 104.

In S1005, the printer 100 compares the ink usage amount after bottle remaining amount low detection 704 with the ink usage amount threshold (cancel) 706. In S1006, the printer 100 performs branching of the process depending on the comparison result of S1005. Specifically, in the case where the ink usage amount after bottle remaining amount low detection 704 is the ink usage amount threshold (cancel) 706 or higher, it can be assumed that the user has replenished the ink tank 507 with the ink from a new ink bottle, and the printer 100 thus proceeds to S1007. Meanwhile, in the case where the ink usage amount after bottle remaining amount low detection 704 is lower than the ink usage amount threshold (cancel) 706, the printer 100 terminates the present process.

In S1007, the printer 100 cancels the bottle remaining amount low. Moreover, in this case, the state of the ink bottle remaining amount transitions from the "bottle remaining amount low detected state" to the "bottle remaining amount low undetected state". In S1008, the printer 100 notifies the server 401 of the cancelation of the bottle remaining amount low. Then, the printer 100 terminates the present process.

As described above, executing the present flow allows the printer 100 to cancel the "bottle remaining amount low detected state" of the ink bottle 303 at a certain timing and notify the server 401 of the cancelation without provision of a special mechanism that measures the ink remaining amount in the ink bottle 303.

Figure 11:
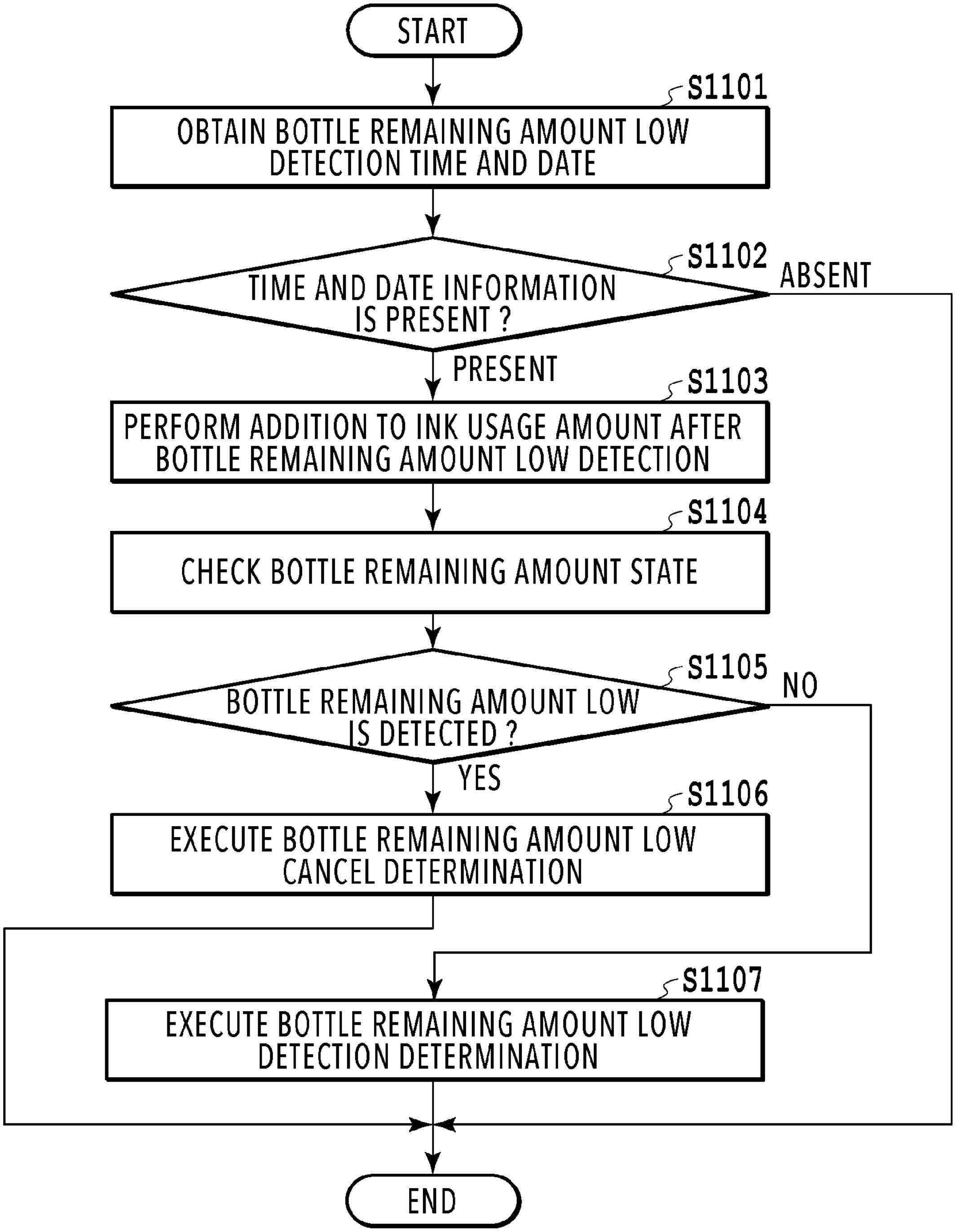
FIG. 11 is a flowchart of an ink usage amount addition process in ink usage.

FIG. 11 is a flowchart of an addition process to the ink usage amount after bottle remaining amount low detection in ink usage executed in the printer 100 in the present embodiment. For example, the CPU 101 illustrated in FIG. 1 reads out a program stored in the ROM 102 to the RAM 103 and executes the program to implement each of processes in FIG. 11. Although the present process normally needs to be performed as many times as the number of ink colors of the ink bottles 303, description is given in the present embodiment while focusing on one color to facilitate understanding. This process is executed at a timing where the ink is used in the printer 100.

In the case where the ink is used in the printer 100, in S1101, the printer 100 obtains the bottle remaining amount low detection time and date 703 for the corresponding ink bottle, from the non-volatile information saved in the EEPROM 104. In S1102, the printer 100 determines whether the bottle remaining amount low detection time and date 703 is obtained in S1101. In the case where the bottle remaining amount low detection time and date 703 is not saved and is not obtained, addition to the ink usage amount after bottle remaining amount low detection is unnecessary, and the printer 100 thus terminates the addition process to the ink usage amount after bottle remaining amount low detection. In the case where the bottle remaining amount low detection time and date 703 is saved, the printer 100 proceeds to S1103.

In S1003, the printer 100 adds an ink usage amount measured from a point where the previous ink usage amount addition is executed, to the ink usage amount after bottle remaining amount low detection 704 saved in the EEPROM 104. Moreover, the printer 100 updates the value of the ink usage amount after bottle remaining amount low detection 704 to a value calculated by the addition, and saves the updated ink usage amount after bottle remaining amount low detection 704 in the EEPROM 104. The ink usage amount used from the previous detection of the bottle remaining amount low is set as the latest ink usage amount by the present process. Then, the ink usage amount calculated in the present process is used in the bottle remaining amount low detection determination or the bottle remaining amount low cancel determination performed after this point. Accordingly, the present process needs to be executed before the bottle remaining amount low detection determination or the bottle remaining amount low cancel determination.

In S1104, the printer 100 checks which one of the "bottle remaining amount low detected state" and the "bottle remaining amount low undetected state" the bottle remaining amount state of the corresponding ink bottle 303 is. In S1105, the printer 100 performs branching of the process based on the state checked in S1004. Specifically, in the case where the bottle remaining amount state of the corresponding ink bottle 303 is the "bottle remaining amount low detected", the printer 100 proceeds to S1106 and executes the bottle remaining amount low cancel determination illustrated in FIG. 10. Meanwhile, in the case where the bottle remaining amount state of the corresponding ink bottle 303 is the "bottle remaining amount low undetected", the printer 100 executes the bottle remaining amount low detection determination illustrated in FIG. 9. Thereafter, the printer 100 terminates the present process.

As described above, executing the present flow allows the printer 100 to execute the bottle remaining amount low detection determination and the bottle remaining amount low cancel determination based on the ink usage amount after bottle remaining amount low detection, at a timing where the ink is used in the printer 100.

The state transition of the remaining amount in the ink bottle 303 illustrated in FIG. 8 is described by using the specific steps in FIGS. 9, 10, and 11. As an example, the size of the ink bottle is 170.0 ml, the ink usage amount threshold (detection) is 127.5 ml, the ink usage amount threshold (cancel) is 85.0 ml, and the in-tank ink remaining amount threshold is 45.0 ml.

Description starts from the point where the state of the remaining amount in the ink bottle 303 is the "bottle remaining amount low undetected state". Assume that the information on the bottle remaining amount low detection time and date is present in S902 and the ink usage amount after bottle remaining amount low detection obtained in S903 is 90.0 ml. In this case, in S906, the ink usage amount is lower than 127.5 ml that is the ink usage amount threshold (detection) 705. Accordingly, the printer 100 terminates the process with the state of the remaining amount in the ink bottle 303 set to the bottle remaining amount low undetected. Then, in the case where the ink usage is repeated and the ink usage amount reaches or exceeds 127.5 ml, the printer 100 proceeds to S907. Even if the total ink usage amount reaches or exceeds 127.5 ml in the determination in S910, the printer 100 terminates the process with the state of the remaining amount in the ink bottle 303 set to the bottle remaining amount low undetected, until the remaining amount in the ink tank reaches or falls below 45.0 ml. For example, in the case where the remaining amount in the ink tank reaches or falls below 50.0 ml, a screen that prompts the user to inject the ink of the ink bottle 303 into the ink tank is displayed. This can prevent the case where the remaining amount in the ink tank reaches or falls below the threshold while the ink is left in the ink bottle 303. In other words, an order for a new ink bottle 303 in a state where the ink is left in the ink bottle 303 can be prevented.

In the case where the user injects all the ink in the ink bottle 303 into the ink tank and then the remaining amount in the ink tank reaches or falls below 45.0 ml, the printer 100 detects the bottle remaining amount low, and the state of the ink bottle remaining amount transitions to the "bottle remaining amount low detected state". Thereafter, the printer 100 executes the subsequent processes.

As illustrated in the state transition diagram of FIG. 8 and FIG. 11, in the "bottle remaining amount low detected state", the bottle remaining amount low cancel determination of FIG. 10 is executed. Assume that the new ink bottle 303 reaches the user as a result of the process of S914, and the ink tank is replenished with the ink of an amount corresponding to its capacity. Assume that the ink usage amount after bottle remaining amount low detection 704 obtained in S1103 of the cancel determination process is 30.0 ml. Since the ink usage amount threshold (cancel) 706 is 85.0 ml, the printer 100 cancels the "bottle remaining amount low detected state" in the case where the usage amount of the ink injected into the ink tank reaches or exceeds 55.0 ml in S1006, and notifies the cancelation to the server. The state of the ink bottle remaining amount thereby transitions to the "bottle remaining amount low undetected state". Accordingly, the process to be executed at the next timing of ink usage is the bottle remaining amount low detection determination of FIG. 9. Note that the ink usage amount obtained in S903 is a total from the time point where the ink usage amount is reset in the previous bottle remaining amount low detection determination process, and is thus at least 85.0 ml.

FIGS. 12A to 12D are examples of a screen displayed on the display unit 106 of the printer 100 in changing of settings relating to the non-volatile information saved in the EEPROM 104. In the present embodiment, the screen is used in the case where the non-volatile information on the ink bottle 303 saved in the EEPROM 104 is to be changed depending on the size of the ink bottle to be used, an installation environment of the printer, or usage conditions.

Figure 12A:
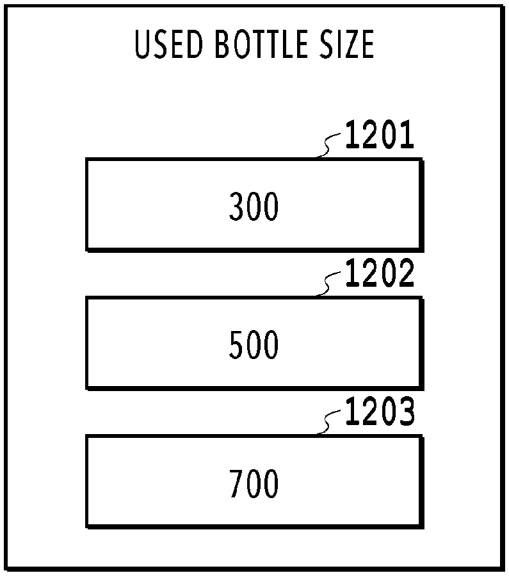
FIGS. 12A to 12D are diagrams illustrating display examples in the printer.

FIG. 12A is an example of an operation screen in the case where the ink bottle size 702 is changed. The user selects the used ink bottle size from displayed buttons 1201, 1202, and 1203.

Figure 12B:
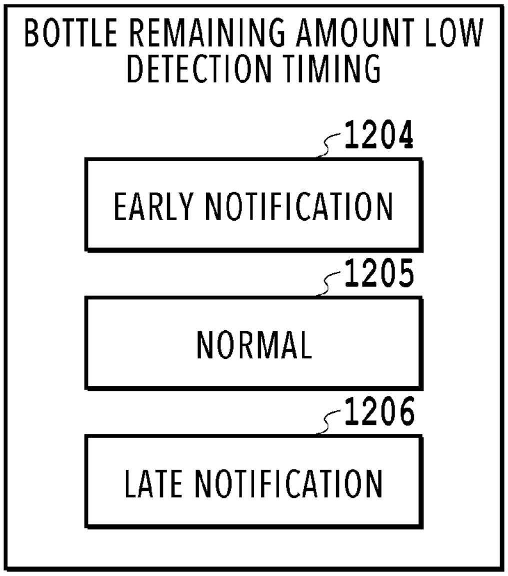

FIG. 12B is an example of an operation screen in the case where the in-tank ink remaining amount threshold 707 is changed. The user selects a timing of detecting the "ink bottle remaining amount low" from buttons 1204, 1205, and 1206, depending on time necessary for the new ink bottle 303 to arrive from the server from the notification of the "ink bottle remaining amount low" to the server.

Figure 12C:
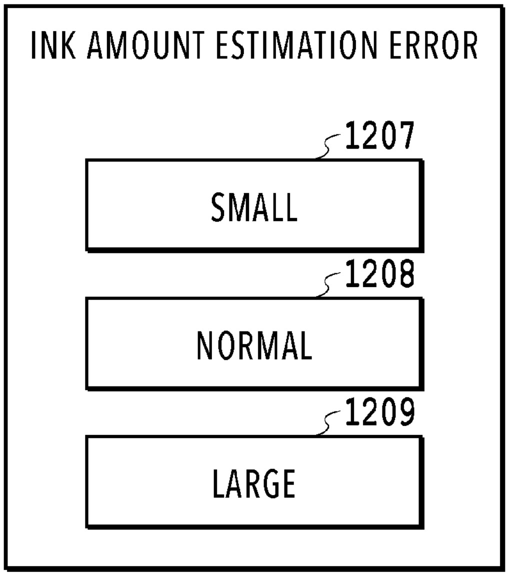

FIG. 12C is an example of an operation screen in the case where the ink usage amount threshold (detection) 705 is changed. The ink usage amount threshold (detection) 705 depending on an ink amount estimation error selected from buttons 1207, 1208, and 1209 is saved in the EEPROM 104.

Figure 12D:
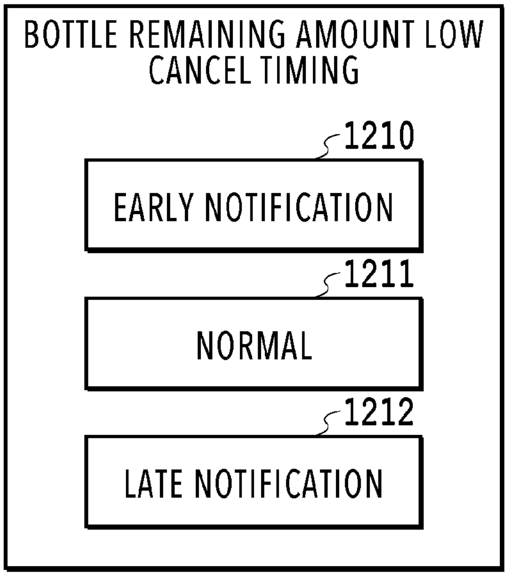

FIG. 12D is an example of an operation screen in the case where the ink usage amount threshold (cancel) 706 is changed. The user selects a timing of canceling the "ink bottle remaining amount low" from buttons 1210, 1211, and 1212 depending on time necessary for the server to complete delivery arrangement of the new ink bottle 303 from the notification of the ink bottle remaining amount low to the server. Although three selectable buttons are prepared for each display in the present embodiment, the number of buttons is not limited to this, and a form in which selection is made from, for example, five levels may be employed. Alternatively, a form in which a desired value is inputted may be employed. Moreover, display contents of the respective buttons are not limited to the contents described in the present embodiment.

As described above, according to the present embodiment, the situation where the ink remaining amount in the ink bottle 303 has become low can be preferably detected. Specifically, the printer 100 can detect the ink remaining amount low in the ink bottle 303 from the ink usage amount in the printer 100 and the ink tank remaining amount, and notify the server 401 of the ink remaining amount low without provision of a mechanism that measures the ink remaining amount in the ink bottle 303. Moreover, the printer 100 can similarly execute the ink bottle remaining amount low cancel determination without provision of a mechanism that measures the ink remaining amount in the ink bottle 303.

Furthermore, as described above, in the process of bottle remaining amount determination in the present embodiment, the printer 100 performs the determination by using both of the ink usage amount and the ink tank remaining amount. The printer 100 can thereby preferably detect the situation where the remaining amount in the ink bottle has become low, even in the case where a measurement error of the ink usage amount occurs.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-014889, filed Feb. 2, 2022, which is hereby incorporated by reference wherein in its entirety.

What is claimed is:

1. A printing apparatus that includes a tank configured to store an expendable injected from an expendable replenishment container and that prints an image by ejecting the expendable from the tank, the printing apparatus comprising:

a first obtaining unit that obtains a usage amount of the expendable from a time point of detection of a situation where a remaining amount of the expendable in the expendable replenishment container is lower than a predetermined value;

a second obtaining unit that obtains a remaining amount in the tank;

a first determination unit that determines a state of the remaining amount of the expendable in the expendable replenishment container by comparing the usage amount obtained by the first obtaining unit and the remaining amount in the tank obtained by the second obtaining unit with thresholds set respectively for the usage amount and the remaining amount; and a detection unit that detects the situation where the remaining amount of the expendable in the expendable replenishment container is lower than the predetermined value, in a case where the state determined by the first determination unit is a remaining amount low state.

2. The printing apparatus according to claim 1, wherein the first determination unit determines that the state of the remaining amount is the remaining amount low state in a case where the usage amount obtained by the first obtaining unit is the first threshold or more and the remaining amount in the tank obtained by the second obtaining unit is the second threshold or less.

3. The printing apparatus according to claim 1, wherein the first determination unit determines that the state of the remaining amount is the remaining amount low state in a case where the usage amount is not obtained by the first obtaining unit and the remaining amount in the tank obtained by the second obtaining unit is a second threshold or less.

4. The printing apparatus according to claim 1, further comprising a notification unit that notifies a server of information indicating that the remaining amount of the expendable in the expendable replenishment container is low, in a case where the detection unit detects the situation where the remaining amount of the expendable is lower than the predetermined value.

5. The printing apparatus according to claim 4, wherein, in the case where the notification unit notifies the server of the information, the printing apparatus resets the usage amount and updates time and date of the detection of the situation where the remaining amount of the expendable in the expendable replenishment container is lower than the predetermined value.

6. The printing apparatus according to claim 4, further comprising a cancel unit that cancels the remaining amount low state depending on whether or not the usage amount obtained by the first obtaining unit has reached or exceeded a third threshold in the remaining amount low state, wherein the notification unit notifies the server of the cancelation of the remaining amount low state by the cancel unit.

7. The printing apparatus according to claim 5, wherein the first obtaining unit is capable of obtaining the usage amount in a case where obtaining of the time and date is successful.

8. The printing apparatus according to claim 1, wherein each of a first threshold, a second threshold, and a third threshold is settable to any value.

9. The printing apparatus according to claim 1, wherein the detection unit performs detection as many times as the number of colors of the expendable included in the printing apparatus.

10. The printing apparatus according to claim 1, wherein the expendable is ink.

11. The control method of a printing apparatus that includes a tank configured to store an expendable injected from an expendable replenishment container and that prints an image by ejecting the expendable from the tank, the control method comprising:

a first obtaining step of obtaining a usage amount of the expendable from a time point of detection of a situation where a remaining amount of the expendable in the expendable replenishment container is lower than a predetermined value;

a second obtaining step of obtaining a remaining amount in the tank;

a first determining step of determining a state of the remaining amount of the expendable in the expendable replenishment container by comparing the usage amount obtained in the first obtaining step and the remaining amount in the tank obtained in the second obtaining step with thresholds set respectively for the usage amount and the remaining amount; and a detecting step of detecting the situation where the remaining amount of the expendable in the expendable replenishment container is lower than the predetermined value, in a case where the state determined in the first determining step is a remaining amount low state.

12. The control method of the printing apparatus according to claim 11, wherein, in the first determining step, the state of the remaining amount is determined to be the remaining amount low state in a case where the usage amount obtained in the first obtaining step is the first threshold or more and the remaining amount in the tank obtained in the second obtaining step is the second threshold or less.

13. The control method of the printing apparatus according to claim 11, wherein, in the first determining step, the state of the remaining amount is determined to be the remaining amount low state in a case where the usage amount is not obtained in the first obtaining step and the remaining amount in the tank obtained in the second obtaining step is a second threshold or less.

14. The control method of the printing apparatus according to claim 11, further comprising a notifying step of notifying a server of information indicating that the remaining amount of the expendable in the expendable replenishment container is low, in a case where the situation where the remaining amount of the expendable is lower than the predetermined value is detected in the detecting step.

15. The control method of the printing apparatus according to claim 14, wherein in the case where the notification of the information to the server is performed in the notifying step, the usage amount is reset and time and date of the detection of the situation where the remaining amount of the expendable in the expendable replenishment container is lower than the predetermined value are updated.

16. The control method of the printing apparatus according to claim 14, further comprising a canceling step of canceling the remaining amount low state depending on whether or not the usage amount obtained in the first obtaining step has reached or exceeded a third threshold in the remaining amount low state, wherein notification of the cancelation of the remaining amount low state in the canceling step is made to the server in the notification step.

17. The control method of the printing apparatus according to claim 15, wherein the usage amount is obtainable in the first obtaining step in a case where obtaining of the time and date is successful.

18. The control method of the printing apparatus according to claim 11, wherein the expendable is ink.

19. A non-transitory computer readable storage medium storing a program which causes a computer to function as a printing apparatus that includes a tank configured to store an expendable injected from an expendable replenishment container and that prints an image by ejecting the expendable from the tank, wherein the program causes the printing apparatus to function as:

a first obtaining unit that obtains a usage amount of the expendable from a time point of detection of a situation where a remaining amount of the expendable in the expendable replenishment container is lower than a predetermined value;

a second obtaining unit that obtains a remaining amount in the tank;

a first determination unit that determines a state of the remaining amount of the expendable in the expendable replenishment container by comparing the usage amount obtained by the first obtaining unit and the remaining amount in the tank obtained by the second obtaining unit with thresholds set respectively for the usage amount and the remaining amount; and a detection unit that detects the situation where the remaining amount of the expendable in the expendable replenishment container is lower than the predetermined value, in a case where the state determined by the first determination unit is a remaining amount low state.

* * * * *